United States Patent [19]
Heiligman

[11] Patent Number: 5,453,118
[45] Date of Patent: Sep. 26, 1995

[54] CARBON-FILLED FUEL VAPOR FILTER SYSTEM

[75] Inventor: Randy B. Heiligman, Minnetonka, Minn.

[73] Assignee: Ultra Pure Systems, Inc., Minneapolis, Minn.

[21] Appl. No.: 287,465

[22] Filed: Aug. 8, 1994

Related U.S. Application Data

[63] Continuation of Ser. No. 70,175, Jun. 2, 1993, abandoned.

[51] Int. Cl.[6] .................................................. B01D 53/04
[52] U.S. Cl. .................................. 96/147; 96/152; 96/153; 55/524; 55/DIG. 5; 123/519
[58] Field of Search .................. 55/514, 524, DIG. 5; 96/108, 143, 147, 152–154; 123/518, 519

[56] References Cited

U.S. PATENT DOCUMENTS

| | | | |
|---|---|---|---|
| 3,025,233 | 3/1962 | Figert | 96/153 X |
| 3,217,715 | 11/1965 | Berger et al. | 96/135 X |
| 3,474,600 | 10/1969 | Tobias | 55/524 |
| 3,477,210 | 11/1969 | Hervert | 123/519 X |
| 3,538,020 | 11/1970 | Heskett et al. | 96/153 X |
| 3,545,622 | 12/1970 | Sakhnovsky et al. | 96/153 X |
| 3,645,072 | 2/1972 | Clapham | 96/153 |
| 3,687,297 | 8/1972 | Kuhn et al. | 96/153 X |
| 3,704,806 | 12/1972 | Plachenov et al. | 96/153 X |
| 3,721,072 | 3/1973 | Clapham | 96/153 |
| 3,857,732 | 12/1974 | Yoshino | 96/153 X |
| 3,919,369 | 11/1975 | Holden | 96/153 X |
| 4,013,566 | 3/1977 | Taylor | 96/153 X |
| 4,058,380 | 11/1977 | King, II | 123/519 X |
| 4,381,929 | 5/1983 | Mizuno et al. | 123/519 X |
| 4,386,947 | 6/1983 | Mizuno et al. | 123/519 X |
| 4,411,948 | 10/1983 | Ogino et al. | 55/524 X |
| 4,504,290 | 3/1985 | Pontius | 55/524 X |
| 4,677,086 | 6/1987 | McCue et al. | 96/153 X |
| 4,852,761 | 8/1989 | Turner et al. | 123/519 X |
| 4,877,001 | 10/1989 | Kenealy et al. | 123/519 |
| 5,002,596 | 3/1991 | Moskaitis et al. | 96/152 |
| 5,033,465 | 7/1991 | Braun et al. | 55/524 X |
| 5,253,629 | 10/1993 | Fornuto et al. | 123/519 |
| 5,256,476 | 10/1993 | Tanaka et al. | 55/524 X |

FOREIGN PATENT DOCUMENTS

| | | | |
|---|---|---|---|
| 2270922 | 1/1976 | France | 96/153 |
| 150381 | 9/1981 | Germany | 96/153 |
| 52-040869 | 3/1977 | Japan | 96/153 |
| 52-063883 | 5/1977 | Japan | 96/153 |
| 53-030988 | 3/1978 | Japan | 96/154 |
| 54-021832 | 8/1979 | Japan | 96/153 |
| 62-186051 | 8/1987 | Japan | 96/153 |
| 62-218651 | 9/1987 | Japan | 06/153 |
| 1-036962 | 2/1989 | Japan | 96/153 |
| 198754 | 11/1938 | Switzerland | 96/154 |
| 619993 | 3/1949 | United Kingdom | 96/147 |
| 2004366 | 3/1979 | United Kingdom | 96/154 |
| 2005016 | 4/1979 | United Kingdom | 96/154 |
| 2126123 | 3/1984 | United Kingdom | 96/153 |

Primary Examiner—Robert Spitzer
Attorney, Agent, or Firm—Kinney & Lange

[57] ABSTRACT

A carbon-filled fuel vapor filter system, including a polymer housing, the polymer housing including a hose inlet, a hose outlet, and a formed block of carbon pellets or granules with a polymer binding between the carbon pellets or granules contained within the fuel filter housing.

20 Claims, 4 Drawing Sheets

CARBON-FILLED FUEL VAPOR FILTER SYSTEM

This is a Continuation of application Ser. No. 08/070,175, filed Jun. 2, 1993, now abandoned.

BACKGROUND OF THE INVENTION

1. Field of the Invention

The present invention pertains to a fuel vapor filter, and more particularly, pertains to a carbon-filled fuel vapor filter canister.

2. Description of the Prior Art

Gasoline Emission Control—A principal application of activated carbon is in the capture of gasoline vapors that escape from vents in automotive fuel systems. Under EPA regulations, all U.S. motor vehicles produced since the early 1970s have been equipped with evaporative emission control systems. Most other auto producing countries now have similar controls. Fuel vapors vented when the fuel tank or carburetor is heated are captured in a canister containing 0.5 to 2 L of activated carbon. Regeneration of the carbon is then accomplished by using intake manifold vacuum to draw air through the canister. The air carries desorbed vapor into the engine where it is burned during normal operation. Activated carbon systems have also been proposed for capturing vapors emitted during vehicle refueling. Activated carbon is used at many gasoline terminals to capture vapor displaced when tank trucks are filled, after the car has been turned off after having run, sitting in hot weather, and at the gas station. Typically, the adsorption vessels contain around 15 $m^3$ of activated carbon and are regenerated by application of a vacuum. The vapor that is pumped off is recovered in an absorber by contact with liquid gasoline. Similar equipment is used in the transfer of fuel from barges. The type of carbon pore structure required for these applications is substantially different from that used in solvent recovery. Because the regeneration conditions are very mild, only the weaker adsorption forces can be overcome, and therefore, the most effective pores are in the mesopore size range. A large adsorption capacity in these pores is possible because vapor concentrations are high, typically 10–60%.

Prior art fuel vapor filters have included loose carbon granules in a housing. The cost to manufacture these types of fuel vapor filters as either original equipment, or aftermarket equipment is expensive. Further, the granules can sink and settle, and loose their efficiency over time. Furthermore, prior art fuel vapor filters have numerous parts which require manufacture and later assembly.

FIG. 1 illustrates a representative prior art fuel vapor filter with many parts, all of which are eliminated by the present invention.

The process used to manufacture these canisters is expensive and dirty. Most importantly the current technology for current loose carbon granule type canisters requires many parts. These parts are eliminated with the herein described invented carbon block technology. In addition, due to settling problems of granular carbon fuel vapor filters in the prior art, the canisters are not filled to capacity.

Prior art canister filters that use loose granules can be converted to block technology and will hold more carbon, thus increasing performance capacity. Many parts that are in the prior art loose type canisters will be eliminated. These include bottom retainer screen and foam pad, pressure retaining strip and lock nut and foam pad and filter paper. Channelling in the present invention is eliminated by using a block of bonded carbon pellets for the present invention. As air will take the course of least resistance a passageway could eventually develop, whereby the air will be taking a path not coming into contact with any carbon, which will then render the prior art canister virtually useless.

The present invention provides a fuel vapor filter which includes carbon pellets bound together with a polymer to prevent settling or compacting, and also addresses the shortcomings of the prior art devices by eliminating prior art parts, and eliminating channeling and also providing a cleaner manufacturing process.

SUMMARY OF THE INVENTION

The general purpose of the present invention is a fuel vapor filter with carbon pellets, bound with a polymer internally aligned in the fuel vapor filter housing. The carbon granules trap and hold these vapors until a reverse vacuum is placed on the canister. The vapors are then directed to the carburetor where they are burned. The auto makers are looking for ways to increase the capacity of these canisters while not having to increase the canister size. They are also looking for a better way to reduce costs and have the vapor filter manufactured with a cleaner process, as filling these canisters with carbon granules is a very dusty and/or dirty process.

According to one embodiment of the present invention, there is provided a fuel vapor filter with a polymer housing, an inlet hose, an outlet hose, and carbon pellets bound together with a polymer in the form of a carbon block within the polymer canister housing of the fuel vapor filter.

One significant aspect and feature of the present invention is a fuel vapor filter with at least one internally formed carbon block element.

Another significant aspect and feature of the present invention is a cleaner manufacturing process.

A further significant aspect and feature of the present invention is that more carbon is actually used in the canister as compared to granules of carbon which ultimately sink and compact in the canister. Different sized granules or pellets can be used, as well as different sizes of filter housings.

Yet another significant aspect and feature of the present invention is that costly extra filter parts are eliminated.

Still another significant aspect and feature of the present invention is that performance and efficiency are greatly improved.

Yet a further significant aspect and feature of the present invention is the elimination of channeling through the center or sides of a carbon granule filled interior.

Still a further significant aspect and feature of the present invention is the incorporation of side flow directional flutes in the canister side walls to prevent air travel between the side of a carbon pellet block and the side wall of a canister.

Having thus described the embodiments of the present invention, the principal object hereof is to provide a fuel vapor filter with an internal carbon block.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
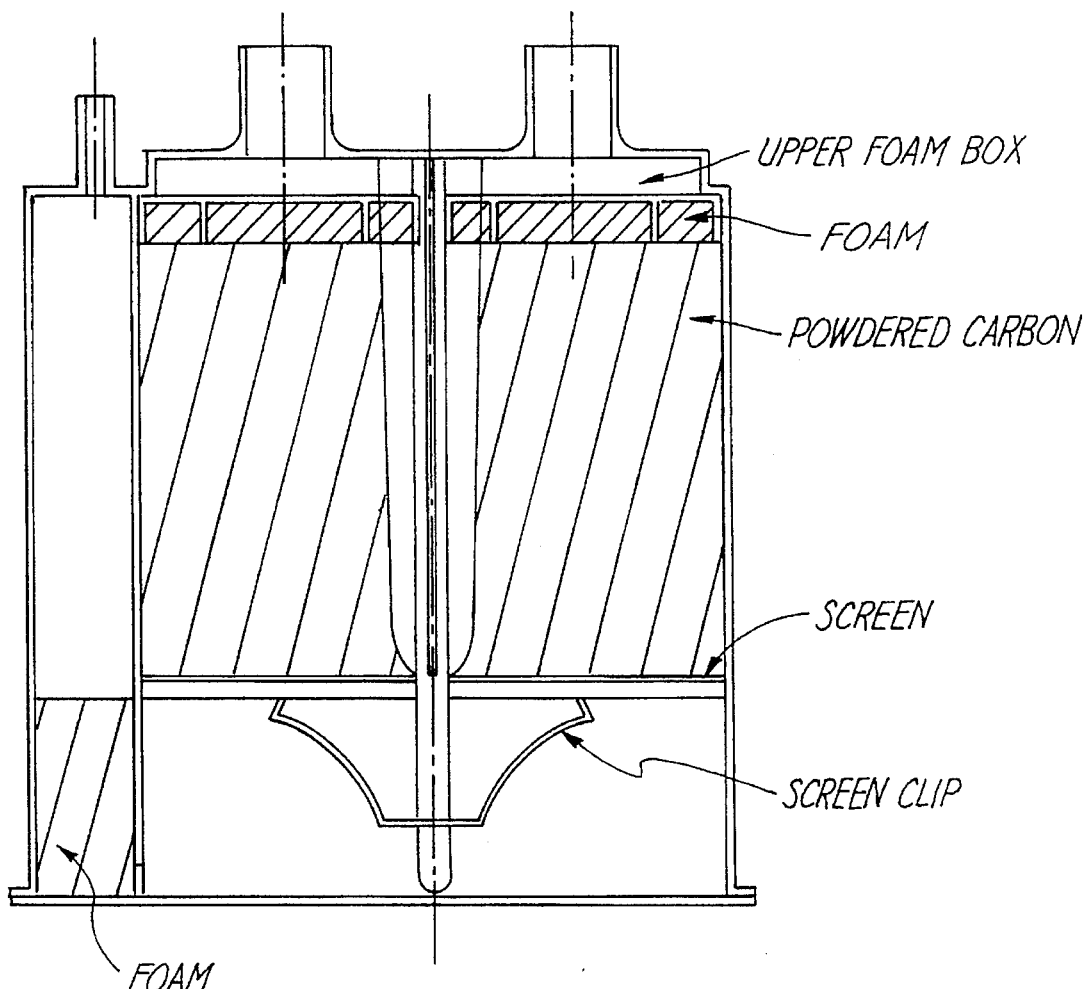
FIG. 1 illustrates a representative prior art fuel vapor filter.
Figure 2:
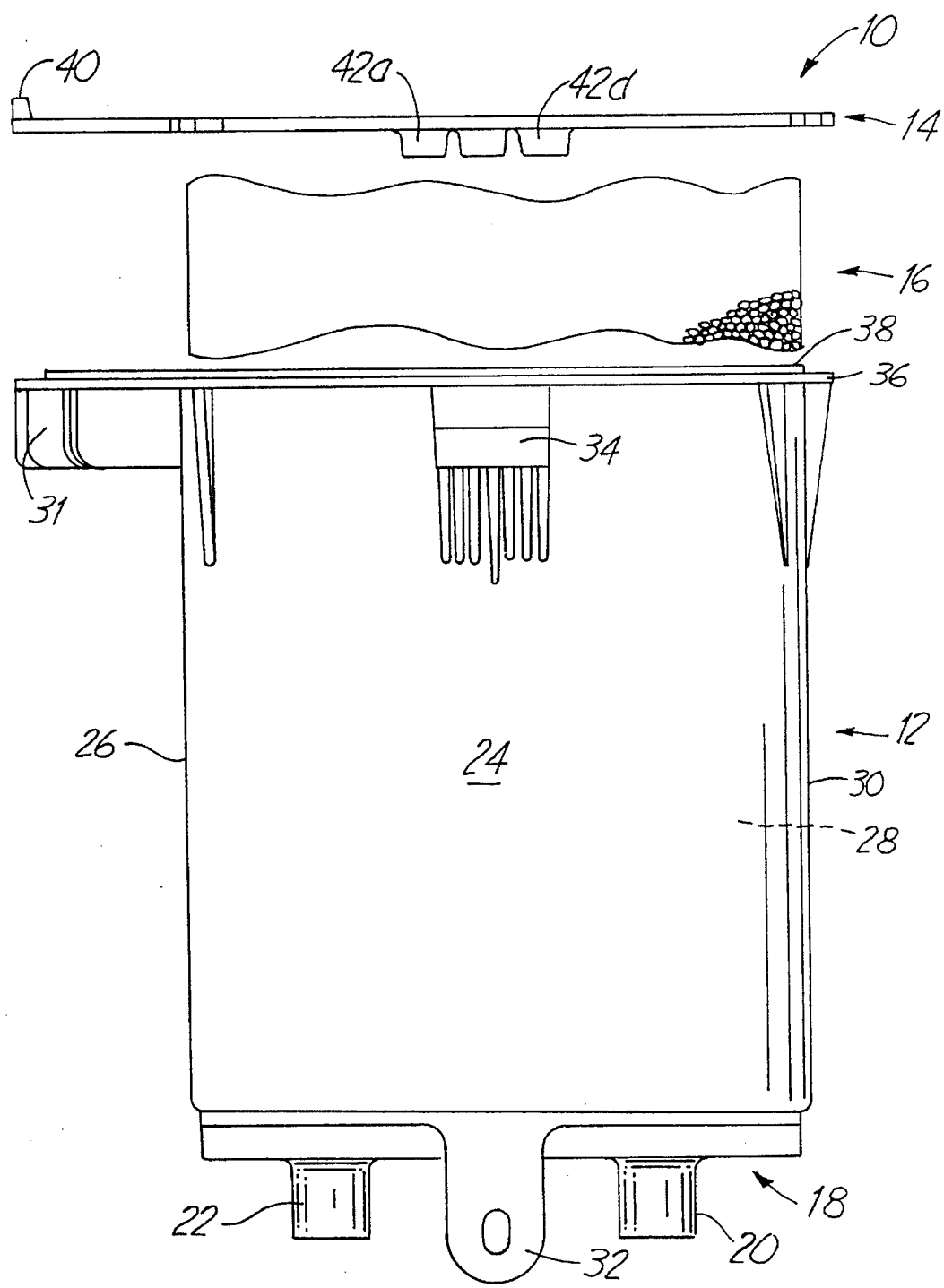
FIG. 2 illustrates an exploded view of the canistered fuel vapor filter of the present invention.

FIG. 2 illustrates an exploded view of the fuel vapor filter 10, including a high temperature polymer housing canister 12, a planar housing top 14 for sealing of the upper portion of the housing canister 12 and a mass of carbon pellets 16 which are bound together by a polymer which fills the interior of the housing canister 12. The housing canister 12 includes a rectangular shaped base 18, cylindrical inlet connection port 20, a cylindrical outlet connection port 22, sides 24, 26, 28 and 30 extending vertically from the base 18, and a semicircular shaped compartment 31 located at the top of side 26. A holed bracket 32 is located at the lower portion of side 24 and a notched bracket 34 is located at the upper portion of side 24, each member of which is used to secure the fuel vapor filter to an appropriate mounting surface. A lip 36, having a sealing surface 38, aligns at about the top edges of sides 24–30 and the compartment 31.

The planar housing top 14 includes a protrusion 40 on its upper surface to insure proper right side up alignment with the lip 36 and the sealing surface 38. A plurality of protrusions 42a–42d extend from the bottom surface of the planar housing top 14 to aid in alignment of the housing top 14 about a vertical rod 44 of FIG. 2.

Figure 3:
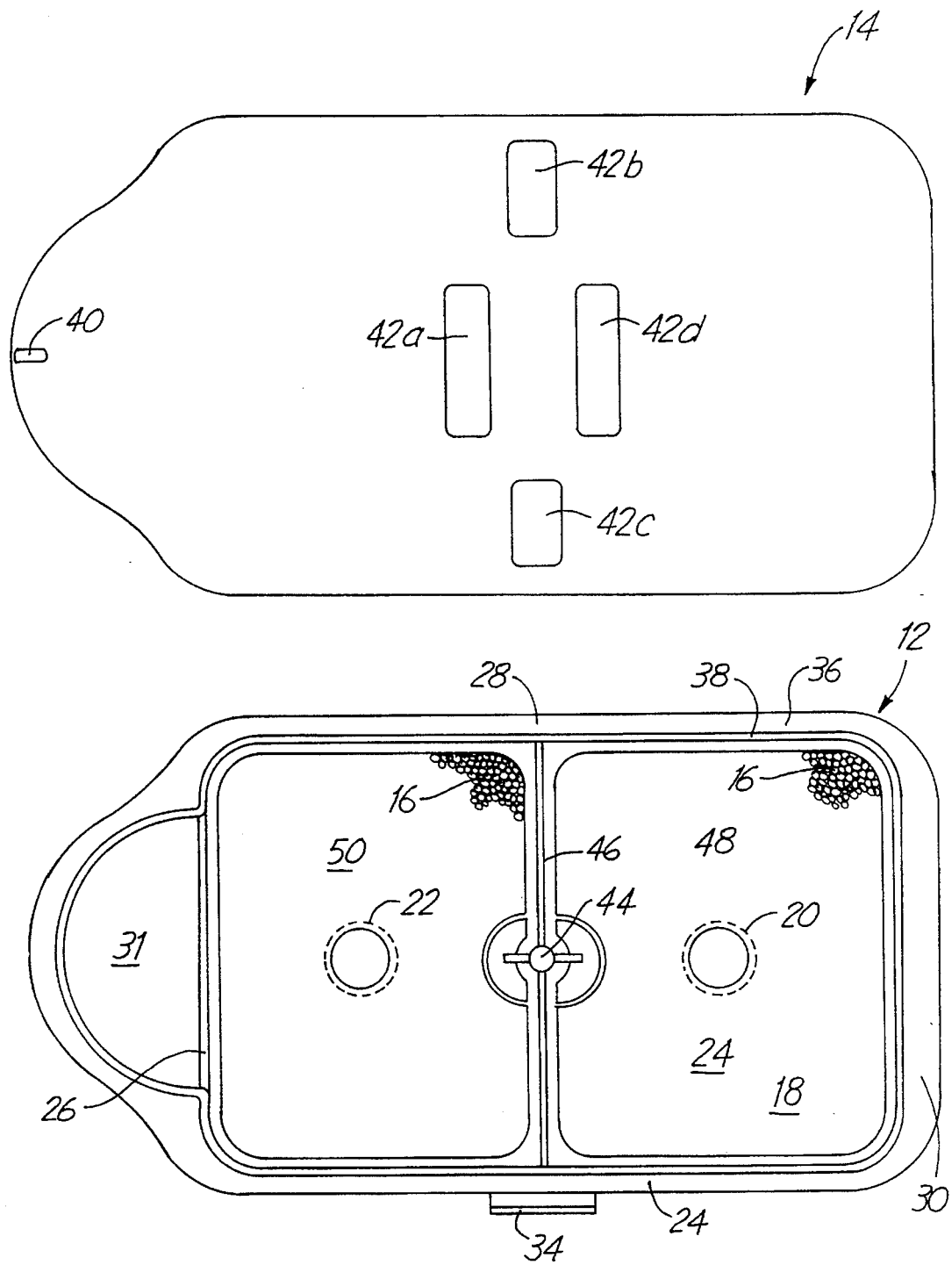
FIG. 3 illustrates a top view of the housing and the planar housing top.

FIG. 3 illustrates a top view of the housing canister 12 and the planar housing 14 where all numerals correspond to those elements previously described. The housing canister 12 includes a panel member 46 extending upwardly from the base 18 between the sides 24 and 28 to a distance of approximately ¾ the height of the housing canister 12 for purposes of illustration and shall not be construed as limiting to the scope of the present invention. This panel 46 divides the interior of the housing canister 12 into opposing chambers 48 and 50 formed by the base 18, sides 24–30 and the common divider wall 46 separating the chambers 48 and 50. Chamber 48 is an inlet chamber and chamber 50 is an outlet chamber. Fuel vapors travel through the block of carbon pellets 16 located in the inlet chamber 48, over the space above the panel 46, separating the inlet and outlet chambers 48 and 50, and through the outlet chamber 50.

Figure 4:
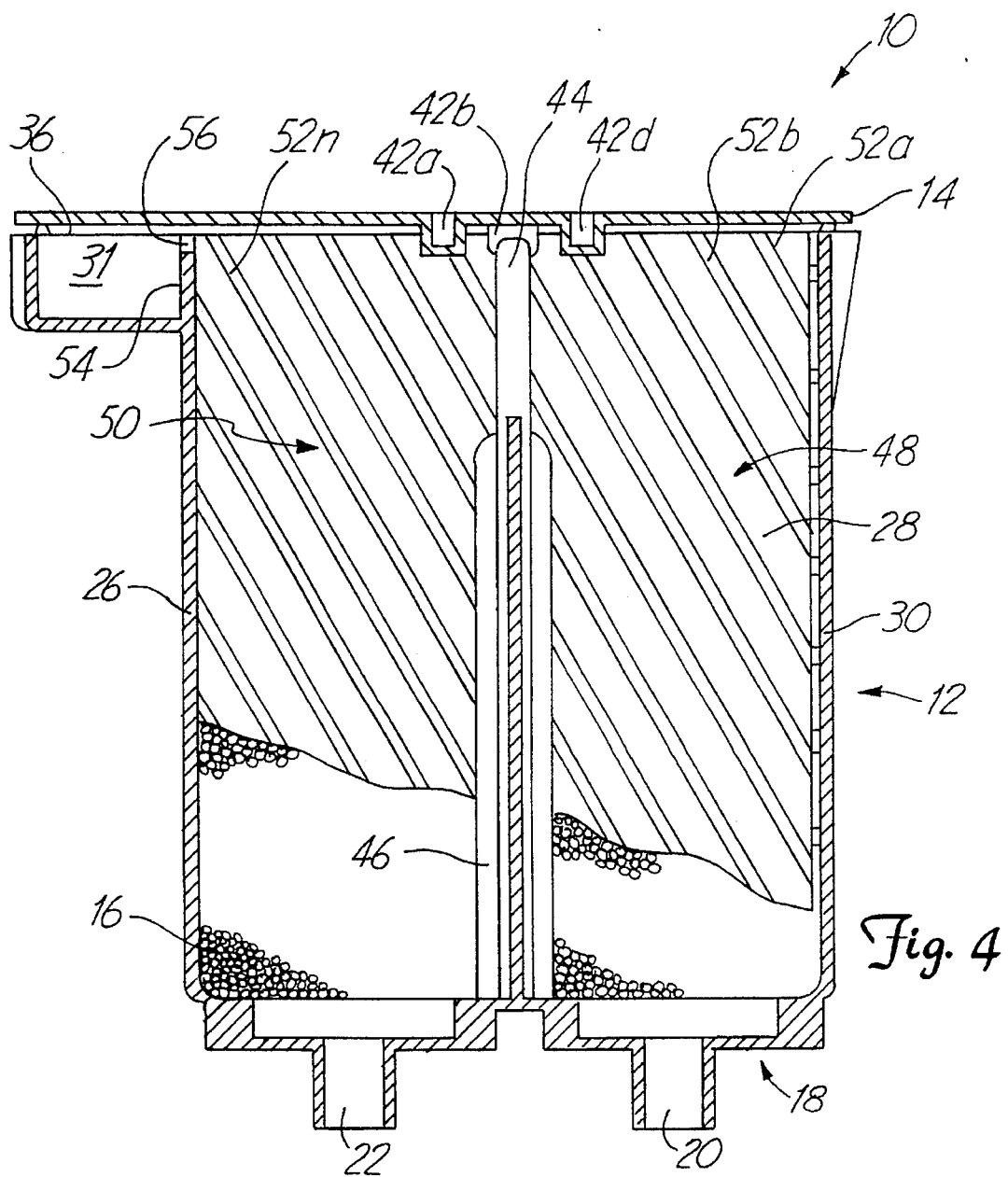
FIG. 4 illustrates a cross-sectional view of the fuel vapor filter.

FIG. 4 illustrates a cross-sectional view of the fuel vapor filter 10 where all numerals correspond to those elements previously described. A plurality of inwardly extending members, such as flutes 52a–52n align about the interior of the walls 26, 28, 30 and 24 which prevent vapors from flowing along the sides of the blocks of carbon pellets 16. The members can be either horizontal or at an angle, but not vertical. The flutes also provide additional strength to the filter housing. The grooves 52a–52n also aid in securement of the blocks of carbon pellets 16 within the interior of the chambers to minimize movement and chafing of the block of carbon pellets 16 with respect to the sides of the housing canister 12. Flow of gas vapors flows through the inlet connection port 20, through the carbon-granule filled chamber 48, over the top of the panel 46, through the carbon-filled chamber 50 and finally through the outlet connection port 22. Gas vapors are absorbed by the blocked carbon pellets 16. Chamber 31 also includes a panel member 54 extending across the mouth of the chamber 31, and includes a passageway 56 between the chamber 50 and the chamber 31 for the flow and passage of gas vapors. The side inwardly angularly extending members help retain the molded and bonded carbon pellet block in position, and also prevent vapors from traveling up along the inner sides of the canister. The inner members can extend slightly into the carbon block.

MODE OF OPERATION

The carbon block can either be formed preferably in the polymer housing of the fuel vapor filter internally, or formed and dropped in place during assembly. If a drop-in block is utilized, an outer skin on the drop-in block may be required. The teachings of the present invention apply to any make or model of fuel vapor canister, and is not limited to the fuel vapor canister structure in the drawing.

The carbon block is a mixture of carbon pellets, such as those available from Westvaco and a polymer for binding the carbon pellets together, such as Microthene in a 4–8% range. The carbon pellets or granules can be 2 mm or 10×25 to 20×100 as an example. In one mode of manufacturing the fuel vapor filter, the mixture of carbon pellets and polymer, such as a powdered polymer, can be filled into a high-temperature polymer housing canister and placed under pressure when the housing is in a metal fixture. The mixture is then heated at an elevated temperature, such as in a range of 250°–500° Fahrenheit, and by way of example 350° Fahrenheit in a downward applied pressure in a range of 100–200 PSI for a predetermined time period, and such as in a range of 1–25 minutes. This mixture provides for the bonding of the granules to each other, while still permitting passage of air flow and vapor flow. The melt index is a function of the polymer binder, the temperature, the pressure and time. Every contour is then filled with carbon in a tight fit on the canister. The high temperature polymer shell can be placed into a metal fixture, and the carbon-polymer mixture can be cooked under pressure.

In operation, the optional side grooves prevent the vapors and air from traveling up between the sides of the canister and the carbon block, and also provide for the securing and holding of the carbon block within the housing canister. The carbon block can also have an optional non-permeable outer skin, such as a polymer skin.

Specifically, there are two and soon to be three purposes for these canisters placed on the vehicle that use gasoline, not diesel fuel. Environmental regulations require that the auto makers not allow fumes to escape the gas tank and be emitted into the atmosphere. This happens under the following circumstances. First, when one's vehicle is outside in the heat, the gasoline will vaporize. When this happens it goes from the gas tank via a hose to the fuel vapor canister. Secondly, after one has been driving the vehicle, the heat from the car after one turns the car off will also cause the gasoline to vaporize, as well as vapors generated from the outside ambient air. Again, these vapors are directed to the carbon canister. When the engine is started, a vacuum is placed on the canister which pulls the trapped vapors out of the carbon block and into the engine where the vapors are burned. Thirdly, and possibly soon to be mandatory, when one fills up the vehicle with gas, the vapors will again have to travel into one of these canisters by regulatory law.

Appendix 1 illustrates the effectiveness of the present invention. +v,1-15/2

Various modifications can be made to the present invention without departing from the apparent scope hereof. The teachings of the present invention apply to all sizes and shapes of fuel vapor filters.

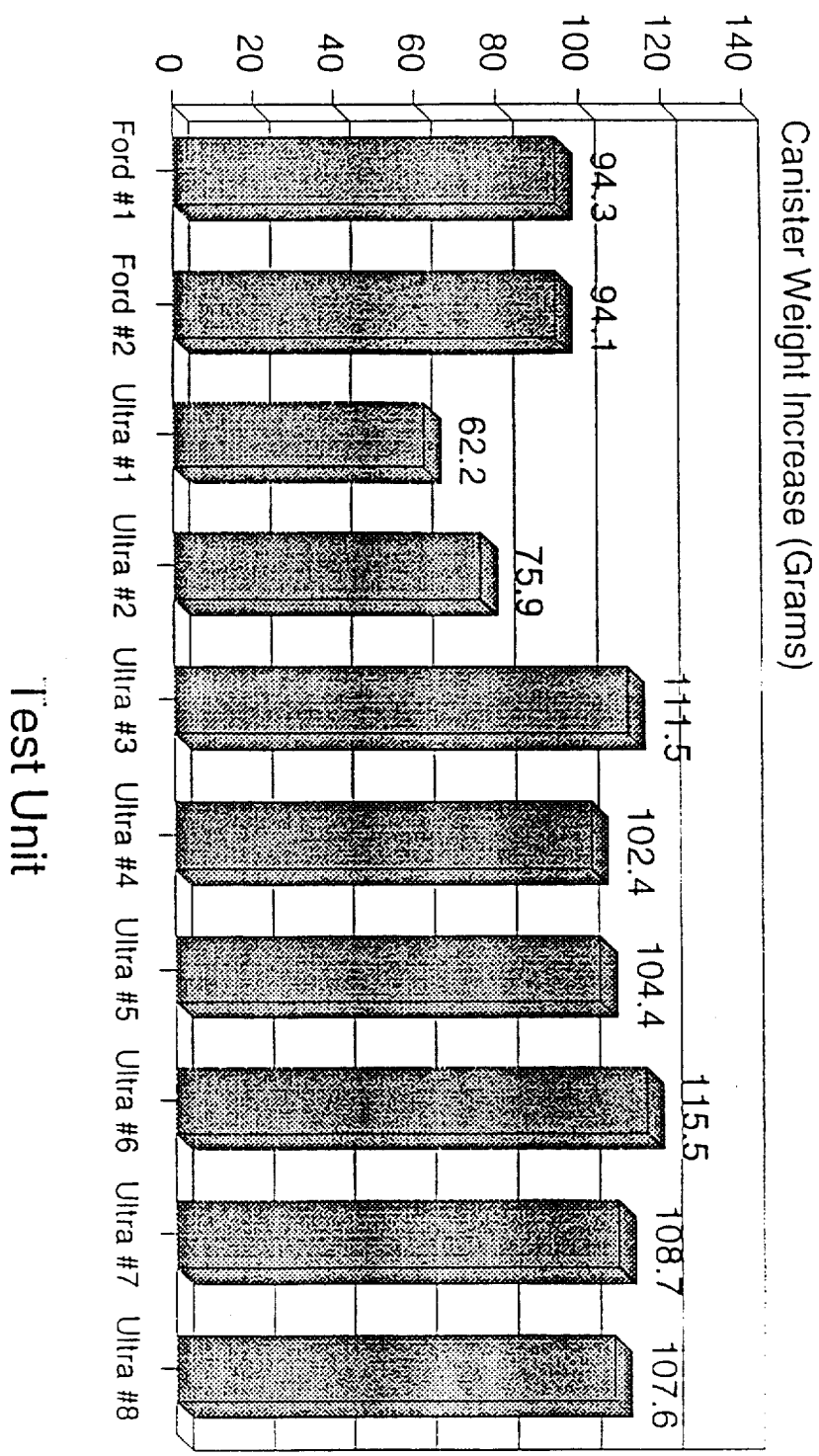

I claim:

1. A fuel vapor filter comprising:

a housing having an inlet means for receiving fuel vapor and an outlet means for outputting fuel vapor; and a carbon block directly molded within the housing, the carbon block being formed by a mixture of carbon pellets and a powdered polymer binder, wherein the mixture of carbon pellets and powdered polymer binder is placed in the housing and heated such that the carbon pellets are joined to each other and formed within the housing such that fuel vapors do not exit the outlet means along a side wall of the housing without having sufficient contact time with the carbon block.

2. The fuel vapor filter of claim 1, wherein the housing is composed of a high temperature polymer.

3. The fuel vapor filter of claim 1, wherein the housing includes inner side member means extending out from the side wall of the housing and into the carbon block to direct vapor flow along the side wall back into the carbon block.

4. The fuel vapor filter of claim 3, wherein the inner side member means includes a plurality of flutes.

5. The fuel vapor filter of claim 1, wherein the inlet means includes an inlet chamber having an inlet at one end thereof for receiving fuel vapor, and wherein the outlet means includes an outlet chamber having an outlet at one end thereof for outputting the fuel vapor, the carbon block being formed in both the inlet and outlet chambers.

6. The fuel vapor filter of claim 5, wherein the inlet and the outlet are positioned at a first end of the housing, and the housing further includes a panel member extending out from the first end separating the inlet chamber from the outlet chamber, the panel having an opening therein to permit the fuel vapor to pass from the inlet chamber to the outlet chamber.

7. The fuel vapor filter of claim 1, wherein the carbon pellets have a mesh size between 10×25 to 20×100 mesh.

8. The fuel vapor filter of claim 1, wherein the polymer binder is in the range of 4% to 8% of the composition of the carbon block.

9. A process of manufacturing a fuel vapor filter comprising the steps of:

providing a fuel vapor canister having an inlet for receiving fuel vapor, an outlet for outputting fuel vapor, and a filter chamber between the inlet and the outlet;

forming a carbon block separate from the fuel vapor canister by:

coating a polymer binder on carbon pellets to form a mixture;

heating the mixture of carbon pellets and polymer binder to join the carbon pellets to each other; and applying a polymer coating on an exterior of the carbon block; and placing the carbon block in the fuel vapor canister such that the polymer coating contacts sides walls of the fuel vapor canister to redirect fuel vapor flowing along the side walls back into the carbon block to increase contact time with the carbon pellets.

10. The process of claim 9, wherein the step of forming the carbon block includes the steps of:

pouring the mixture of carbon pellets and polymer binder into a mold and vibrating the mold;

supplying a pressure to the mold; and heating the mold for a predetermined time interval while the mold is under pressure.

11. The process of claim 10, wherein the pressure is between 100–200 psi.

12. The process of claim 10, wherein the predetermined time interval is between 1–25 minutes.

13. The process of claim 9, wherein the carbon pellets have a size between 10×25 to 20×100 mesh.

14. The process of claim 9, wherein the polymer binder is in the range of 4% to 8% of the composition of the carbon block.

15. The process of claim 9 wherein the heating step is performed with the carbon block under pressure between 100–200 psi.

16. A process for making fuel vapor filter comprising the steps of:

providing a high temperature polymer canister casing;

placing said casing into a mold;

providing a mixture of carbon granules and a polymer binder;

pouring said mixture of the carbon particles and polymer binder into said casing;

heating said casing including said mixture under pressure over a predetermined time interval to bind the carbon granules to each other;

cooling said mixture and allowing said mixture to set; and securing a top on said canister.

17. A process of making a fuel vapor filter comprising the steps of:

providing a fuel vapor canister having a inlet for receiving fuel vapor, an outlet for outputting fuel vapor, and a filter chamber between the inlet and the outlet defined by sides walls of the canister; and forming a carbon block directly in the filter chamber by:

providing a mixture of carbon pellets and a polymer binder in the filter chamber; and heating the canister to melt the polymer binder to bond the carbon pellets to each other and to the side walls of the canister such that fuel vapor flowing along the side walls is redirected back into the carbon block to increase contact time with the carbon pellets.

18. The process of claim 17, wherein the carbon pellets have a size between 10×25 to 20×100 mesh.

19. The process of claim 17, wherein the polymer binder is in the range of 4% to 8% of the composition of the carbon block.

20. The process of claim 17 wherein the heating step is performed with the carbon block under pressure between 100–200 psi.

* * * * *

UNITED STATES PATENT AND TRADEMARK OFFICE
CERTIFICATE OF CORRECTION

PATENT NO. : 5,453,118
DATED : September 26, 1995
INVENTOR(S) : Randy B. Heiligman It is certified that error appears in the above-indentified patent and that said Letters Patent is hereby corrected as shown below:

Col. 4, last line, delete "+v,1-15/2", and insert --Appendix--

Signed and Sealed this

Twenty-third Day of January, 1996

Attest:

BRUCE LEHMAN

Attesting Officer

Commissioner of Patents and Trademarks

UltraPure Systems
Activated Carbon Block
Evaporative Emission Canister
Butane Adsorption and Flow Resistance

APPENDIX 1

Ultra Pure Systems
Activated Carbon Block
Evaporative Emission Canister

Butane Adsorption and Flow Resistance

Report Number
0338-082692

To

Mr. Randy Heiligman
President
Ultra Pure Systems
14495 23rd Avenue North
Minneapolis, MN 55447
Phone: (612) 476-8080
FAX: (612) 476-8082

From

Spectrum Labs Inc.
301 West County Road E2
New Brighton, MN 55112
Phone: (612) 633-0101
FAX: (612) 633-1402

August 26, 1992

| | | | |
|---|---|---|---|
| Bruce D. Saaski<br>Spectrum Labs, Inc. | Date | Margaret L. Bicking | Date |

Evaluation of the UltraPure Systems Activated Carbon Block Evaporative Emission Canister

Butane Adsorption and Flow Resistance

Introduction

UltraPure Systems has developed a proprietary compression molding process which allows them to produce immobilized blocks of powdered and granular activated carbon with extremely low pressure drop. These carbon blocks can be produced in a variety of different sizes and shapes for incorporation into specialty products that currently utilize loose beds of granular activated carbon (GAC). By replacing the loose beds of GAC in these products with solid immobilized blocks of activated carbon, several significant performance advantages can be realized. These advantages include the reduction, and in many cases, the virtual elimination of carbon fines commonly associated with loose bed applications of GAC and more importantly the ability to decrease the particle size distribution range thereby increasing surface area and the number of active sites of adsorption. In many cases, the immobilized carbon block unit can be several times more effective in a particular application than a granular unit of the same size. Likewise, the use of solid activated carbon block technology can often save time during assembly and in many instances reduces the number of individual components used to manufacture a specific product.

One particular application where this technology could be extremely effective in terms of both cost and performance, is in automobile evaporative emission carbon canisters which currently use a pelletized form of GAC produced primarily by West Vaco. These evaporative emission canisters are an integral part of the automobile pollution control system and prevent gasoline fumes from dispersing into the atmosphere when the gasoline tank is filled.

Spectrum Labs, Inc. is pleased to submit this laboratory report as the result of an independent third party comparison performance evaluation of the Ford Motor Company Evaporative Emission Canister using the current loose media configuration and the UltraPure Systems Evaporative Emission Canisters utilizing novel compression molded carbon block technology for butane adsorption and flow resistance.

Experimental Section

The UltraPure Systems activated carbon block and Ford Motor Company loose GAC evaporative emission canisters were evaluated for butane adsorption and flow resistance using the "FSEL Butane Break-Thru" and "FSEL Flow Resistance" laboratory test procedures provided by Paul Luft of Ford Motor Company. This test protocol was developed to insure a standard, repeatable, level of operation with a known carbon canister, for system and vehicle development. A list of test equipment and an outline of the Ford Motor Compar "FSEL Butane Break-Thru" laboratory test procedure are described below.

Test Equipment

1) Butane flow stand capable of 1.5 $\pm$ 0.2 grams/minute
2) Scale, accurate and repeatable to $\pm$ 0.5 gram.
3) EPA approved carbon traps (e.g. Steffey carbon traps provided by Paul Luft Ford Motor Company were used for this set of experiments).
4) Miscellaneous hoses and fittings.

Laboratory Procedure

1) Identify canister, weigh and record as received.
2) Purge canister with ambient lab air for 20 minutes at 2.0 CFM, weigh caniste and record.
3) Install carbon trap(s) on the vent port(s), connect the butane vapor hose to the vapor inlet of the canister. Unless otherwise specified seal all openings except the fresh air inlet(s).
4) Begin butane flow at 0.6 g/min, weigh the carbon trap(s) every five minutes until a weight gain of 0.5 grams, at this point break-thru has occurred. Weigl the canister and record.
5) Seal all openings of the canister to retain the break-thru condition.

Following assembly of the mechanical test fixture, the evaporative emission carbon canisters supplied by Ford Motor Company (controls) and those submitted by UltraPure Systems were evaluated using the Ford Motor Company "Butane Break-Thru" test protocol. Each canister was first weighed and then purged with laboratory air for 20 minutes at a flow rate of 2.0 cubic feet per minute (CFM). The weight of each test unit was again recorded after the 20 minute purge with laboratory air, prior to the start of butane flow through the tesi units. The butane flow rate was maintained at 0.6 liters per minute (LPM) for all tests. Immediately following the butane adsorption evaluation, Ford Motor Company Test Unit #2, and UltraPure Systems Test Unit #3 were purged with laboratory air for 20 minutes in order to return each canister as close to its original weight as possible. After the 20 minute purge, the Ford Butane Break-Thru test was repeated a second time on these units. The results of laboratory analysis for the butane adsorption evaluation are presented in Tables 1 and 2.

In addition to the butane adsorption test, all units were evaluated for flow resistance using the FSEL Flow Resistance test procedure provided by Ford Motor Company. An air flow meter and magnehelic pressure gauge were installed appropriately to allow documentation of system operation. Ambient laboratory air was then passed through each test unit and readings from the magnehelic pressure gauge taken at air flows of 0.5 CFM, 1.0 CFM and 2.0 CFM. Readings were taken three times at each flow rate, one set with and one set without test units attached to the test fixture. These sets of readings were then averaged and the average reading taken without the test unit installed (e.g. flow resistance of test fixture) subtracted from the average reading taken with the test unit installed. The result is the average flow resistance in inches of water for each test unit. The results of laboratory analysis for the flow resistance evaluation are presented in Table 3.

Table 1

Results from Butane Adsorption Studies for the Ford Motor Company and UltraPure Systems Evaporative Emission Canisters

Ford Motor Company Evaporative Emission Canisters

| Ford Test Unit #1 | |
|---|---|
| Time (Min.) | Carbon Trap Weight (Grams) |
| 5 | 210.5 |
| 10 | 210.9 |
| 15 | 210.9 |
| 20 | 210.9 |
| 25 | 210.9 |
| 30 | 210.8 |
| 35 | 210.8 |
| 40 | 210.8 |
| 45 | 210.8 |
| 50 | 210.8 |
| 55 | 210.9 |
| 60 | 210.9 |
| 65 | 210.8 |
| 70 | 210.8 |
| 75 | 210.8 |
| 80 | 210.9 |
| 85 | 211.2 |
| 90 | 213.4 |
| 95 | -------- |

Initial Carbon Trap Weight: 210.9 g
Final Carbon Trap Weight: 213.4 g

Initial Canister Weight: 566.2 g
Weight After 20 Min. Purge: 566.2 g
Final Canister Weight: 660.5 g
Weight Increase: 94.3 g

| Ford Test Unit #2 | |
|---|---|
| Time (Min.) | Carbon Trap Weight (Grams) |
| 5 | 211.5 |
| 10 | 211.6 |
| 15 | 211.5 |
| 20 | 211.5 |
| 25 | 211.5 |
| 30 | 211.5 |
| 35 | 211.5 |
| 40 | 211.5 |
| 45 | 211.5 |
| 50 | 211.5 |
| 55 | 211.5 |
| 60 | 211.5 |
| 65 | 211.5 |
| 70 | 211.5 |
| 75 | 211.5 |
| 80 | 211.4 |
| 85 | 211.4 |
| 90 | 211.5 |
| 95 | 211.5 |
| 100 | 211.6 |
| 105 | 213.5 |

Initial Carbon Trap Weight: 211.5 g
Final Carbon Trap Weight: 213.5 g

Initial Canister Weight: 582.8 g
Weight After 20 Min. Purge: 582.8 g
Final Canister Weight: 676.9 g
Weight Increase: 94.1 g

Table 1 (Continued)

Results from Butane Adsorption Studies for the Ford Motor Company and UltraPure Systems Evaporative Emission Canisters

UltraPure Systems Evaporative Emission Canisters

| UltraPure Test Unit #1 10 oz - 2 mm | | UltraPure Test Unit #2 10 oz. - 50% 2 mm 50% 10x25 | |
|---|---|---|---|
| Time (Min.) | Carbon Trap Weight (Grams) | Time (Min.) | Carbon Trap Weight (Grams) |
| 5 | 211.5 | 5 | 210.2 |
| 10 | 211.6 | 10 | 210.2 |
| 15 | 211.6 | 15 | 210.0 |
| 20 | 211.5 | 20 | 210.2 |
| 25 | 211.5 | 25 | 210.2 |
| 30 | 211.6 | 30 | 210.3 |
| 35 | 211.6 | 35 | 210.2 |
| 40 | 211.7 | 40 | 210.3 |
| 45 | 211.7 | 45 | 210.2 |
| 50 | 212.0 | 50 | 210.2 |
|  |  | 55 | 210.3 |
|  |  | 60 | 210.4 |
|  |  | 65 | 210.5 |
|  |  | 70 | 210.6 |
|  |  | 75 | 211.1 |

| UltraPure Test Unit #1 | | UltraPure Test Unit #2 | |
|---|---|---|---|
| Initial Carbon Trap Weight: | 211.50 g | Initial Carbon Trap Weight: | 210.2 g |
| Final Carbon Trap Weight: | 211.98 g | Final Carbon Trap Weight: | 211.1 g |
| Initial Canister Weight: | NR* | Initial Canister Weight: | NR* |
| Weight After 20 Min. Purge: | 870.5 g | Weight After 20 Min. Purge: | 855.1 g |
| Final Canister Weight: | 932.7 g | Final Canister Weight: | 931.0 g |
| Weight Increase: | 62.2 g | Weight Increase: | 75.9 g |

* The initial evaporative emission canister weight for UltraPure Systems Test Units #1 and #2 were inadvertently not recorded prior to the 20 minute purge with laboratory air and the start of butane flow through the test units.

Table 1 (Continued)

Results from Butane Adsorption Studies for the Ford Motor Company and UltraPure Systems Evaporative Emission Canisters

UltraPure Systems Company Evaporative Emission Canisters

| UltraPure Test Unit #3 15 oz. - 2 mm | | UltraPure Test Unit #4 13 oz. - 2 mm | |
|---|---|---|---|
| Time (Min.) | Carbon Trap Weight (Grams) | Time (Min.) | Carbon Trap Weight (Grams) |
| 5 | 210.7 | 5 | 211.1 |
| 10 | 210.7 | 10 | 211.0 |
| 15 | 210.7 | 15 | 211.0 |
| 20 | 210.8 | 20 | 211.0 |
| 25 | 210.8 | 25 | 211.0 |
| 30 | 210.8 | 30 | 211.0 |
| 35 | 210.8 | 35 | 211.0 |
| 40 | 210.8 | 40 | 211.0 |
| 45 | 210.8 | 45 | 211.0 |
| 50 | 210.8 | 50 | 211.0 |
| 55 | 210.8 | 55 | 211.0 |
| 60 | 210.8 | 60 | 211.0 |
| 65 | 210.8 | 65 | 211.0 |
| 70 | 210.8 | 70 | 211.0 |
| 75 | 210.8 | 75 | 211.0 |
| 80 | 210.8 | 80 | 211.0 |
| 85 | 210.8 | 85 | 211.0 |
| 90 | 210.8 | 90 | 211.0 |
| 95 | 210.8 | 95 | 211.0 |
| 100 | 210.8 | | |
| 105 | 211.3 | | |
| Initial Carbon Trap Weight: | 210.8 gr | Initial Carbon Trap Weight: | 211.1 gr |
| Final Carbon Trap Weight: | 211.3 gr | Final Carbon Trap Weight: | 212.0 gr |
| Initial Canister Weight: | 816.5 gr | Initial Canister Weight: | 729.0 gr |
| Weight After 20 Min. Purge | 816.3 gr | Weight After 20 Min. Purge | 728.5 gr |
| Final Canister Weight: | 927.8 gr | Final Canister Weight: | 830.9 gr |
| Weight Increase: | 111.5 gr | Weight Increase: | 102.4 gr |

Table 1 (Continued)

Results from Butane Adsorption Studies for the Ford Motor Company and UltraPure Systems Evaporative Emission Canisters

UltraPure Systems Evaporative Emission Canisters

| UltraPure Test Unit #5 14 oz. - 2 mm | |
|---|---|
| Time (Min.) | Carbon Trap Weight (Grams) |
| 5 | 211.5 |
| 10 | 211.5 |
| 15 | 211.5 |
| 20 | 211.5 |
| 25 | 211.5 |
| 30 | 211.5 |
| 35 | 211.5 |
| 40 | 211.5 |
| 45 | 211.5 |
| 50 | 211.5 |
| 55 | 211.5 |
| 60 | 211.5 |
| 65 | 211.5 |
| 70 | 211.5 |
| 75 | 211.5 |
| 80 | 211.5 |
| 85 | 211.5 |
| 90 | 211.5 |
| 95 | 211.5 |
| 100 | 212.7 |
| | |
| Initial Carbon Trap Weight: | 211.5 g |
| Final Carbon Trap Weight: | 212.7 g |
| Initial Canister Weight: | 751.6 g |
| Weight After 20 Min. Purge: | 752.2 g |
| Final Canister Weight: | 856.2 g |
| Weight Increase: | 104.0 g |

| UltraPure Test Unit #6 14.5 oz. - 75% 2 mm and 25% 10x25 | |
|---|---|
| Time (Min.) | Carbon Trap Weight (Grams) |
| 5 | 210.5 |
| 10 | 210.5 |
| 15 | 210.5 |
| 20 | 210.5 |
| 25 | 210.5 |
| 30 | 210.5 |
| 35 | 210.5 |
| 40 | 210.6 |
| 45 | 210.5 |
| 50 | 210.5 |
| 55 | 210.5 |
| 60 | 210.5 |
| 65 | 210.5 |
| 70 | 210.6 |
| 75 | 210.5 |
| 80 | 210.6 |
| 85 | 210.6 |
| 90 | 210.6 |
| 95 | 210.6 |
| 100 | 210.6 |
| 105 | 210.7 |
| 110 | 212.2 |
| | |
| Initial Carbon Trap Weight: | 210.5 g |
| Final Carbon Trap Weight: | 212.2 g |
| Initial Canister Weight: | 791.3 g |
| Weight After 20 Min. Purge: | 792.4 g |
| Final Canister Weight: | 903.9 g |
| Weight Increase: | 115.5 g |

Table 1 (Continued)

Results from Butane Adsorption Studies for the Ford Motor Company and UltraPure Systems Evaporative Emission Canisters

UltraPure Systems Evaporative Emission Canisters

| UltraPure Test Unit #7 12.5 oz. - 10x25 | | UltraPure Test Unit #8 12.8 oz. - 50% 2 mm 50% 10x25 | |
|---|---|---|---|
| Time (Min.) | Carbon Trap Weight (Grams) | Time (Min.) | Carbon Trap Weight (Grams) |
| 5 | 213.1 | 5 | 212.2 |
| 10 | 213.1 | 10 | 212.2 |
| 15 | 213.1 | 15 | 212.2 |
| 20 | 213.1 | 20 | 212.2 |
| 25 | 213.1 | 25 | 212.2 |
| 30 | 213.1 | 30 | 212.2 |
| 35 | 213.1 | 35 | 212.2 |
| 40 | 213.1 | 40 | 212.2 |
| 45 | 213.1 | 45 | 212.2 |
| 50 | 213.1 | 50 | 212.2 |
| 55 | 213.1 | 55 | 212.2 |
| 60 | 213.1 | 60 | 212.2 |
| 65 | 213.1 | 65 | 212.2 |
| 70 | 213.1 | 70 | 212.3 |
| 75 | 213.1 | 75 | 212.3 |
| 80 | 213.1 | 80 | 212.3 |
| 85 | 213.1 | 85 | 212.3 |
| 90 | 213.1 | 90 | 212.3 |
| 95 | 213.1 | 95 | 212.3 |
| 100 | 213.1 | 100 | 212.6 |
| 105 | 214.7 | 105 | 213.8 |
| Initial Carbon Trap Weight: | 213.1 g | Initial Carbon Trap Weight: | 212.2 g |
| Final Carbon Trap Weight: | 214.7 g | Final Carbon Trap Weight: | 213.8 g |
| Initial Canister Weight: | 731.2 g | Initial Canister Weight: | 724.0 g |
| Weight After 20 Min. Purge: | 735.1 g | Weight After 20 Min. Purge: | 726.1 g |
| Final Canister Weight: | 843.8 g | Final Canister Weight: | 833.7 g |
| Weight Increase: | 108.7 g | Weight Increase: | 107.6 g |

Table 2

Results from Butane Adsorption Studies for the Ford Motor Company and UltraPure Systems Evaporative Emission Canisters

Second Butane Adsorption Evaluation Following Twenty Minute Purge

| Ford Test Unit #2 | |
|---|---|
| Time (Min.) | Carbon Trap Weight (Grams) |
| 5 | 211.8 |
| 10 | 211.8 |
| 15 | 211.8 |
| 20 | 211.8 |
| 25 | 211.8 |
| 30 | 211.8 |
| 35 | 211.9 |
| 40 | 211.9 |
| 45 | 211.9 |
| 50 | 211.9 |
| 55 | 211.9 |
| 60 | 211.9 |
| 65 | 211.9 |
| 70 | 211.9 |
| 75 | 214.1 |

Initial Carbon Trap Weight: 211.8 g
Final Carbon Trap Weight: 214.1 g

Initial Canister Weight: 676.8 g
Weight After 20 Min. Purge: 603.5 g
Final Canister Weight: 679.2 g
Weight Increase: 75.7 g

| UltraPure Test Unit #3 15 oz. - 2mm | |
|---|---|
| Time (Min.) | Carbon Trap Weight (Grams) |
| 5 | 211.5 |
| 10 | 211.5 |
| 15 | 211.5 |
| 20 | 211.5 |
| 25 | 211.6 |
| 30 | 211.6 |
| 35 | 211.6 |
| 40 | 211.6 |
| 45 | 211.6 |
| 50 | 211.6 |
| 55 | 211.6 |
| 60 | 211.6 |
| 65 | 211.6 |
| 70 | 211.6 |
| 75 | 211.6 |
| 80 | 211.6 |
| 85 | 211.6 |
| 90 | 211.6 |
| 95 | 211.6 |
| 100 | 211.6 |
| 105 | 212.4 |

Initial Carbon Trap Weight: 211.5 g
Final Carbon Trap Weight: 212.4 g

Initial Canister Weight: 882.0 g
Weight After 20 Min. Purge: 823.2 g
Final Canister Weight: 931.3 g
Weight Increase: 108.1 g

Table 3

Air Flow Resistance

| Canister Model | Flow Rate (CFM) | Average Pressure Without Canister (Inches of $H_2O$) | Average Pressure with Canister (Inches of $H_2O$) | Average Flow Resistance of Canister (Inches of $H_2O$) |
|---|---|---|---|---|
| Ford #1 | 0.5 | 0.3 | 0.7 | 0.4 |
|  | 1.0 | 1.1 | 2.4 | 1.3 |
|  | 2.0 | 3.9 | 7.3 | 3.4 |
| Ford #2 | 0.5 | 0.3 | 0.7 | 0.4 |
|  | 1.0 | 1.0 | 2.2 | 1.2 |
|  | 2.0 | 4.0 | 7.1 | 3.1 |
| UltraPure #1 | 0.5 | - | - | - |
|  | 1.0 | 1.1 | 6.6 | 5.5 |
|  | 2.0 | 4.0 | >8.0 | - |
| UltraPure #2 | 0.5 | 0.3 | 5.4 | 5.1 |
|  | 1.0 | 1.0 | >8.0 | - |
|  | 2.0 | 4.0 | >8.0 | - |
| UltraPure #3 | 0.5 | - | - | - |
|  | 1.0 | 1.0 | 3.2 | 2.2 |
|  | 2.0 | 4.0 | >8.0 | - |
| UltraPure #4 | 0.5 | - | - | - |
|  | 1.0 | 1.0 | 3.5 | 2.5 |
|  | 2.0 | 4.0 | >8.0 | - |
| UltraPure #5 | 0.5 | - | - | - |
|  | 1.0 | 1.1 | 3.0 | 1.9 |
|  | 2.0 | 4.0 | >8.0 | - |
| UltraPure #6 | 0.5 | - | - | - |
|  | 1.0 | 1.1 | 7.0 | 5.9 |
|  | 2.0 | 4.0 | >8.0 | - |
| UltraPure #7 | 0.5 | 0.2 | 3.4 | 3.2 |
|  | 1.0 | 4.0 | >8.0 | - |
|  | 2.0 | 4.0 | >8.0 | - |

Results

The results of laboratory analysis for the butane adsorption evaluation indicate that all of the UltraPure Systems test units evaluated except Test Units #1 and #2 were able to adsorb more butane by weight than the two identical Ford carbon canisters which were run as controls. These results can be correlated with the total amount of activated carbon contained in each of the UltraPure Systems test units where the two units containing the least amount of carbon (e.g. test unit #1 and #2) exhibited the poorest performance.

The best performance was observed in Ultrapure Systems Test Unit #6 where a weight increase of 115.5 grams was observed using 406 grams of an activated carbon formulation composed of 75 percent by weight 2 mm particle size activated carbon and 25 percent by weight 10x25 mesh carbon. Similar performance was observed in UltraPure Systems Test Unit #3 which had a weight increase of 111.5 grams at the end of the butane break-thru test. This unit contained a carbon block formulated with 420 grams of 2 mm particle size activated carbon. The weight increase for the remaining UltraPure Systems tes units ranged between 102.4 and 108.7 grams. In the second butane adsorption test, which was performed following a 20 minute purge with laboratory air on UltraPure Systems Test Unit #3 and Ford Motor Company Test Unit #2, the Ultr Pure Systems test unit again was able to adsorb significantly more butane by weight than the Ford Test Unit. A graphical representation of the laboratory dat is included at the end of this report.

The results of laboratory analysis for the flow resistance evaluation indicate tha the majority of the UltraPure Systems test units evaluated had significantly more resistance to air flow compared to the two identical Ford Motor Company test units. The flow resistance for Ford Test Unit #1 was measured at 1.3 inches of water at 1.0 CFM and for Test Unit #2, 1.2 inches of water at 1.0 CFM. Similar flow resistance performance was observed in only two of the UltraPure Systems test units evaluated, where the flow resistance for Test Unit #3 was measured a 2.2 inches of water at 1.0 CFM and Test Unit #5, 1.9 inches of water at 1.0 CFM Due to the higher than expected flow resistance of the UltraPure test units and the linear range of the magnehelic pressure gauge, the flow resistance was not measured at all three flow rates (e.g. 0.5, 1.0, and 2.0 CFM) for all of the UltraPure Systems test units. Where the pressure in inches of water was greater than the upper limit of the magnehelic pressure gauge (e.g. 8.0 inches c $H_2O$) the result in Table 3 is simply given as a greater than sign and the number 8.0. In these cases, the actual flow resistance of the evaporative emission carbon canister could not be recorded at the specified air flow rate.

Conclusion

The UltraPure Systems Evaporative Emission Canisters containing proprietary immobilized blocks of activated carbon significantly outperformed the loose GAC evaporative emission canisters supplied by Ford Motor Company in the butane adsorption evaluation. Only two out of the eight UltraPure Systems test units evaluated failed to adsorb more butane than the two identical Ford test units. However, the Ford test units had the least flow resistance of all of the test units evaluated. The performance of the two Ford Motor Company test units (controls) was very consistent with weight increases of 94.3 and 94.1 grams in the butane break-thru evaluation and a flow resistance of 1.3 and 1.2 inches of $H_2O$ at 1.0 CFM in the flow resistance evaluation. UltraPure Systems Test Units #3 and #5 were the only test units that had comparable flow resistance results. The best overall performance in terms of both butane adsorption and flow resistance was observed with UltraPure Systems Test Unit #3 which had a weight increase of 111.5 grams in the butane break-thru evaluation and an average flow resistance of 2.2 inches of $H_2O$ at 1.0 CFM.